United States Patent
Dorenbosch et al.

(10) Patent No.: US 6,963,739 B2
(45) Date of Patent: Nov. 8, 2005

(54) METHOD AND APPARATUS FOR PROVIDING INFORMATION INTERCEPT IN AN AD-HOC WIRELESS NETWORK

(75) Inventors: Jheroen Pieter Dorenbosch, Paradise, TX (US); Richard Lionel Bennett, Southlake, TX (US)

(73) Assignee: Motorola, Inc., Schaumburg, IL (US)

(*) Notice: Subject to any disclaimer, the term of this patent is extended or adjusted under 35 U.S.C. 154(b) by 198 days.

(21) Appl. No.: 10/274,864

(22) Filed: Oct. 21, 2002

(65) Prior Publication Data
US 2004/0203582 A1 Oct. 14, 2004

(51) Int. Cl.[7] ............................................. H04Q 7/20
(52) U.S. Cl. ..................... 455/406; 455/519; 455/11.1; 455/41.2
(58) Field of Search .............................. 455/41.1, 41.2, 455/41.3, 502, 503, 500, 456.1, 411, 410, 455/405, 406, 407, 519; 370/218, 238, 238.1, 370/348

(56) References Cited

U.S. PATENT DOCUMENTS

| | | | |
|---|---|---|---|
| 5,913,161 A | 6/1999 | Ozulkulu et al. | 455/405 |
| 6,073,013 A | 6/2000 | Agre et al. | 455/428 |
| 6,157,824 A * | 12/2000 | Bailey | 455/409 |
| 6,430,395 B2 * | 8/2002 | Arazi et al. | 455/41.2 |
| 6,505,049 B1 * | 1/2003 | Dorenbosch | 455/456.2 |
| 6,735,417 B2 * | 5/2004 | Fonseca et al. | 455/11.1 |
| 6,738,599 B2 * | 5/2004 | Black et al. | 455/62 |
| 2002/0122410 A1 * | 9/2002 | Kulikov et al. | 370/349 |
| 2002/0128000 A1 * | 9/2002 | do Nascimento, Jr. | 455/414 |
| 2002/0164996 A1 * | 11/2002 | Dorenbosch | 455/456 |
| 2003/0179750 A1 * | 9/2003 | Hasty et al. | 370/390 |
| 2004/0059914 A1 * | 3/2004 | Karaoguz | 713/168 |

* cited by examiner

Primary Examiner—Tilahun Gesésse
(74) Attorney, Agent, or Firm—Charles W. Bethards

(57) ABSTRACT

A reporting mobile station (800) operating in an ad-hoc wireless network (600) and method therein, receives, from the infrastructure (611), designation information (506) identifying a target mobile station, and stores (704) the designation information. The reporting mobile station then detects (706) a communication from the target mobile station, and stores (708) information (508) about the communication. The reporting mobile station then reports (710) the call information to a predetermined lawful intercept entity (612).

9 Claims, 4 Drawing Sheets

METHOD AND APPARATUS FOR PROVIDING INFORMATION INTERCEPT IN AN AD-HOC WIRELESS NETWORK

FIELD OF THE INVENTION

This invention relates in general to wireless communication systems, and more specifically to a method and apparatus for providing information intercept in an ad-hoc wireless network.

BACKGROUND OF THE INVENTION

In today's cellular systems, lawful intercept (LI) as may be required for law enforcement is done either by direct interception of radio signals, or by interception inside the wired infrastructure. This does not work well in ad-hoc wireless networks. Direct interception of radio signals is difficult, because of the limited range (e.g., 200 meters) of the devices; interception in the infrastructure is unreliable, because the infrastructure is not actively involved in all of the calls. Call information and call data for such calls cannot be intercepted in the traditional way.

Thus, what is needed is a method and apparatus for providing information intercept in an ad-hoc wireless network. Preferably, the method and apparatus will operate reliably, without requiring direct interception by a law enforcement agency and without requiring real-time involvement of the network infrastructure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all, other than prior art figures, in accordance with the present invention.

DETAILED DESCRIPTION OF THE PREFERRED EMBODIMENTS

In overview form the present disclosure concerns ad-hoc wireless communications systems in which mobile stations (MSs) can spontaneously form a communication network. More particularly, various inventive concepts and principles embodied as a method and apparatus for providing information intercept in an ad-hoc wireless network will be discussed, disclosed, and explained. The communications systems of particular interest are those being deployed and developed for very short-range (e.g., less than 200 meter) communications such as IEEE 802.11, HiperLan, and the like, extended through networking, although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit the invention in any manner. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in one or more conventional digital signal processors (DSPs), or with integrated circuits (ICs) such as custom or application specific ICs or software programs and instructions. It is expected that one of ordinary skill, notwithstanding possibly significant effort and many design choices motivated by, for example, available time, current technology, and economic considerations, when guided by the concepts and principles disclosed herein will be readily capable of programming such DSPs, generating such ICs, or writing such software with minimal experimentation. Therefore, in the interest of brevity and minimization of any risk of obscuring the principles and concepts according to the present invention, further discussion of such DSPs, ICs, and software if any, will be limited to the essentials with respect to the principles and concepts employed by the preferred embodiments.

Figure 1:
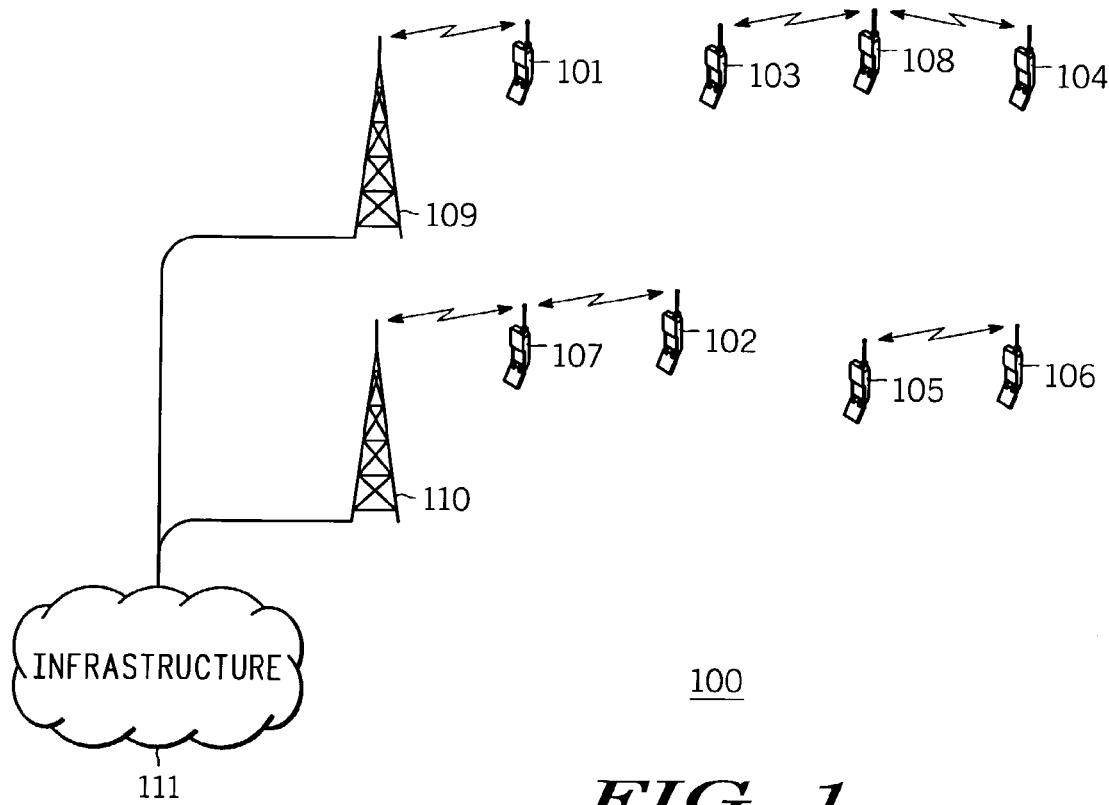
FIG. 1 is a block diagram of a prior-art ad-hoc wireless network.

Referring to FIG. 1, a block diagram of a prior-art ad-hoc wireless network 100 depicts a plurality of mobile stations (MSs) 101–108. The ad-hoc wireless system has to support various modes of communication. For example, an MS (like the MS 101) that is close to a fixed transceiver or access point 109 can communicate with the wired infrastructure via that transceiver. It does so much like the well-known 802.11 or Bluetooth mobile would communicate with a fixed transceiver.

An MS that is too far from a fixed transceiver 110 can communicate with the wired world as well, and does so with the help of an intermediate MS (e.g., the MS 102 can communicate with the help of the MS 107). Such MSs 102 and 107 preferably will establish the communication without intervention by the wired infrastructure 111. Direct communication also can take place between isolated mobiles in the ad-hoc system (e.g., the MS 105 and the MS 106). Isolated MSs can also communicate via one or more intermediate mobiles (e.g., the MS 103 and the MS 104 communicate via the MS 108).

When one considers how provisioning is done in an ad-hoc system, it becomes clear that the MSs preferably will have storage resources that are under the control of the system operator and that cannot be modified or erased by the end user of the MS. For example, in the memory of each MS 101–108 there must be an operator-controlled area with information for provisioning, and other operator controlled information, such as encryption keys. The information is needed so that the operator can control the calls made while MSs are isolated from the wired infrastructure, as are the MSs 103–106.

Figure 2:
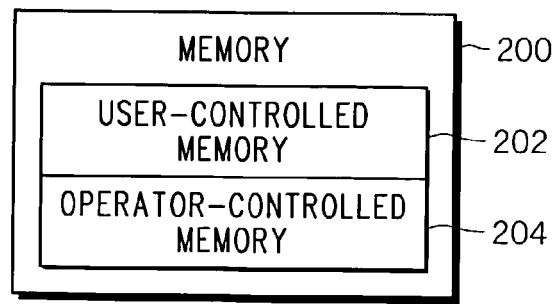
FIG. 2 is a memory structure diagram used in the prior-art ad-hoc wireless network.

Referring to FIG. 2, a memory structure diagram depicts a memory 200 used in the prior-art ad-hoc wireless network. The memory 200 comprises a user-controlled memory portion 202, and an operator-controlled memory portion 204. The user-controlled memory portion 202 stores, for example, user-programmed parameters and temporary user data. The operator-controlled memory portion 204 provides for long-term storage of call-related information, and the system operator is able to read and modify the information contained therein. The MS is also able to capture information and store it in the operator-controlled memory portion 204 when it cannot communicate with the infrastructure 111, and also able to deliver that information at a later time when contact can be established.

Figure 3:
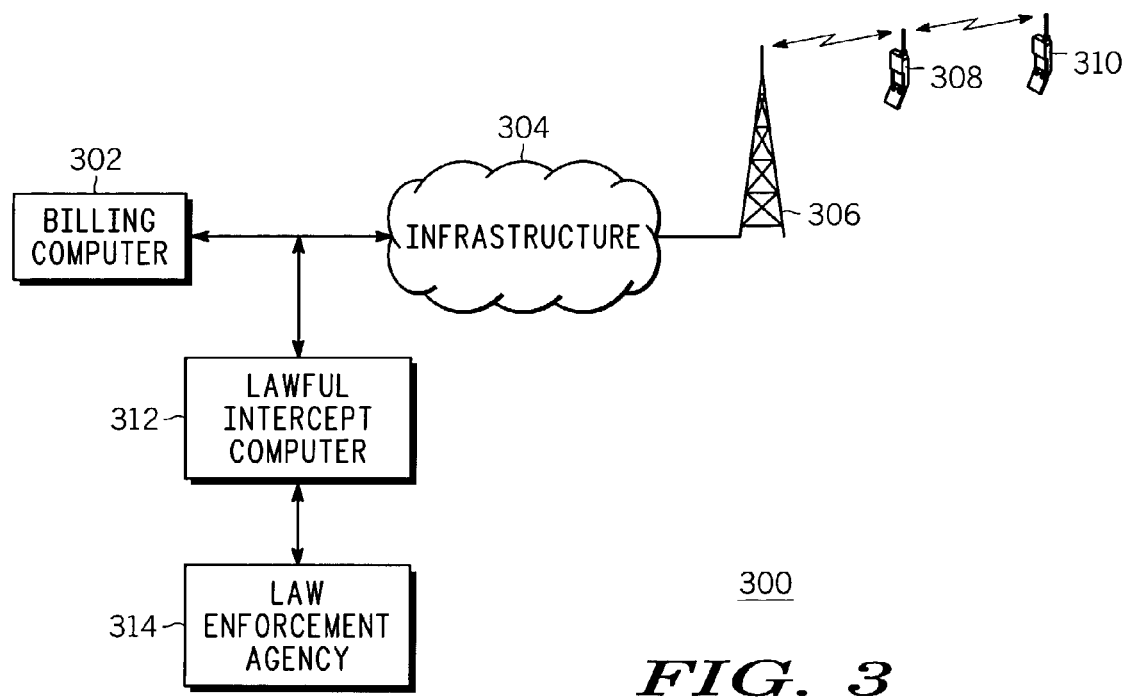
FIG. 3 is a block diagram depicting an exemplary first embodiment of a lawful intercept arrangement in an ad-hoc wireless network in accordance with the present invention.

FIG. 3 is a block diagram depicting an exemplary first embodiment of a lawful intercept arrangement in an ad-hoc wireless network 300. The MSs 308, 310 capture call information about calls. The MSs then store the call information inside the MSs in operator-controlled memory so that it can be gathered later when an MS contacts a Fixed Network Element (FNE), such as the transceiver 306. This provides for a method of lawful intercept that is based on the call information that is provided by the MSs 308, 310 to the infrastructure 304. Preferably, MSs 308, 310 will provide this information for all calls, even if the calls are made while an MS is isolated from the wired infrastructure. Call information typically includes the identities of the participants, who originated the call, and time and duration of the call. Optionally it may include a unique call identifier, information about the location of the participants, the quality of the call, whether the call was for voice or for data and how much data was transferred. Such call information is typically referred to as billing information, billing records or call detail records. In a wireless system, a participant identity may take numerous representations. To facilitate lawful intercept, the MSs 308, 310 may capture all representations of the identities known to the MSs for a participant. Identity representations may include a uniform resource identifier (URI), an Internet Protocol (IP) address, a Media Access Control (MAC) address, an Integrated Services Digital Network (ISDN) number, an International Mobile Subscriber Identity (IMSI), or a temporary identifier assigned by the wireless system.

The wired infrastructure 304 sooner or later obtains the billing information from the MSs through a fixed transceiver 306 and forwards the billing information to the billing computer 302 via a conventional billing interface (not shown). For security and privacy reasons, billing information will preferably be forwarded in encrypted form. The billing computer may also be a computer used to monitor the amount, type and quality of the traffic in the ad-hoc network, and may not generate bills if the ad-hoc network uses flat-rate billing. An LI (Lawful Intercept) computer 312 inspects all billing records and intercepts those records for which a warrant exists. Note in order to minimize the processing load on the MS the information retained and forwarded to or intercepted by the LI computer can be sent by the MS in an un-translated form, thus any translation between Identity representations and monitored device or target device or participant IDs is the responsibility of the LI computer. The LI computer 312 then forwards the information to the law enforcement agency 314.

The LI computer 312, preferably, is attached to the interface into the billing computer 302. The LI computer 312 then can examine all billing records, much like a properly configured computer can examine all email that passes through an observed channel through well-known techniques. Examination is preferably transparent to the rest of the network, and even to the system operator.

The LI computer 312 contains a list of warrants with such information as target identity, start time, expiration time, law enforcement agency, and warrant type. For warrants that require the interception of signaling information, the LI computer 312 captures all billing records related to calls made while the warrant is valid. The LI computer 312 then forwards such records to the law enforcement agency 314.

It will be appreciated that, alternatively, the surveillance target can be identified within all portions of the infrastructure 304 that report billing information to the billing computer 302. These portions of the infrastructure can then duplicate the billing information for surveilled subscribers and deliver the billing information directly to the LI computer 312.

Figure 4:
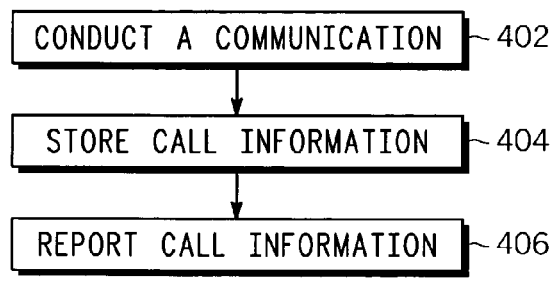
FIG. 4 is a flow chart depicting operation of the first embodiment of the lawful intercept arrangement in accordance with the present invention.

FIG. 4 is a flow chart 400 depicting operation of the first embodiment of the lawful intercept arrangement. The flow begins when a first MS conducts 402 a communication with a second MS, both MSs isolated from contact with a fixed portion, e.g., infrastructure 304, of the wireless network. The first MS can be communicating directly with the second MS, or can be relaying the communication from the second MS to another MS operating in the wireless network. The first MS then stores 404 call information about the communication in a memory location of the first MS, the memory location not modifiable by a user of the first MS. When the first MS regains contact with the fixed portion, the first MS reports 406 the call information to the fixed portion. The fixed portion then preferably reports the call information to the billing computer 302. Alternatively, the fixed portion can report the call information directly to the lawful intercept computer 312. Normally the first MS will capture and store call information for all calls that it participates in or relays. It may even capture and store call information for a call that is taking place between nearby third and forth MSs, and that is not relayed by the first MS. Obviously this requires a large amount of storage memory. Therefore, in one embodiment, the first MS can receive designation information identifying a target MS by specification of the MS's identifier, using one or more of the representations thereof. In that embodiment, the first MS stores the call information only when the second MS is identified as the target MS by the designation information.

Figure 5:
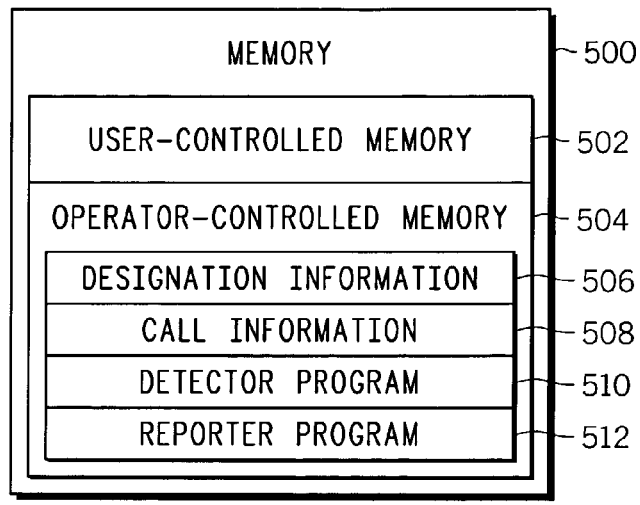
FIG. 5 is an exemplary memory structure diagram of a memory used in a mobile station in accordance with a second embodiment of the present invention.

FIG. 5 is an exemplary memory structure diagram of a memory 500 used in a mobile station. As in the prior-art memory 200, the memory 500 comprises a user-controlled memory portion 502 and an operator-controlled memory portion 504. However, several new elements have been added to the operator-controlled memory portion of the novel memory 500. The new elements comprise a first location for storing designation information 506. Here, the system operator programs a list of identifiers of target MSs that are to be surveilled. The list also contains the type of surveillance required for each target. Many countries, for example, designate either (1) intercept related information (IRI), which includes the calling and called parties, along with a time-stamp, (2) actual call content (ACC), or (3) both IRI and ACC.

The operator-controlled memory portion 504 further comprises a second location for storing call information 508 about an intercepted communication, including IRI and ACC, as appropriate. The operator-controlled memory portion 504 also includes a detector program 510 for programming the MS to detect a communication from a target MS. In addition, the operator-controlled memory portion 504 includes a reporter program 512 for programming the MS to report the call information to a predetermined lawful intercept entity or to a predetermined billing computer. Note that while the memory 504 is referred to as operator controlled memory it is controlled by some entity other than the user of the MS. Typically this will be an operator or other entity that is part of or associated with the infrastructure such as a service provider or the lawful intercept entity 612 or perhaps billing agent or computer 302. Also of course the MS controls this portion of memory while recording surveillance information or data or when a reporting activity is initiated by MS.

Obviously, programming is done while the MS can be reached by the infrastructure via zero, one, or more other MSs. Preferably, a repeated multicast mechanism is used for this purpose. Alternatively, other kinds of conventional over-the-air (OTA) programming can be utilized for programming the MSs. Because end-users can not read the operator controlled memory, the identifiers of the surveilled targets will remain secret, as required.

It will be appreciated that the deletion of information in the operator-controlled memory portion 504 is under control of the operator. The operator may choose to delete any call information 508 that has been reported by the reporter program 512 to the predetermined lawful intercept entity or billing computer.

Figure 6:
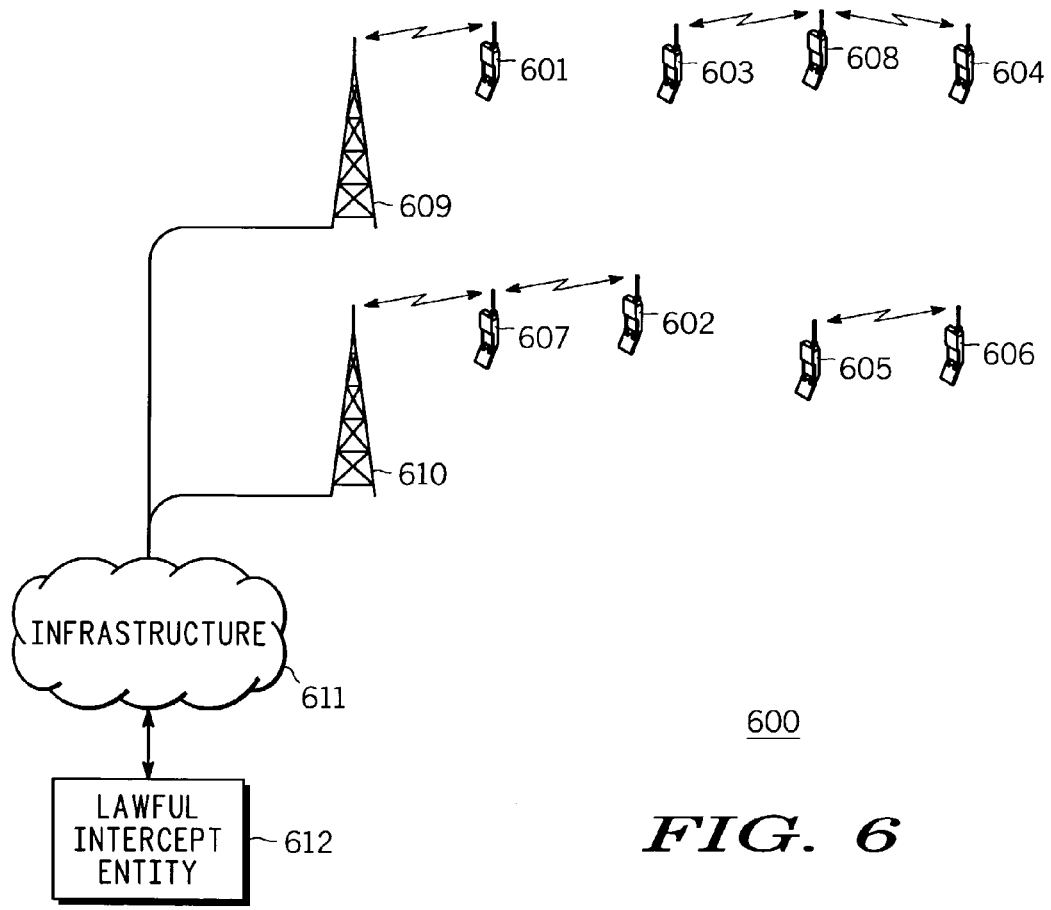
FIG. 6 is a block diagram of an exemplary ad-hoc wireless network in accordance with the present invention.

FIG. 6 is a block diagram of an exemplary ad-hoc wireless network 600 arranged according to the principles and concepts discussed herein. In the wireless network 600, at least some of the MSs 601–608 preferably include the memory 500 arranged and programmed in accordance with the present invention.

In one variation of the wireless network 600, interception is then done as follows. A relaying MS, e.g., the MS 607, that is relaying information for another MS, e.g., the MS 602, will check whether the other MS is in the list of surveilled targets. If so, the relaying MS will capture IRI and/or ACC, as specified by the designation information 506, and forward it to the infrastructure 611, and thence to the LI entity 612, through one of the fixed transceivers 609, 610. It will be appreciated that the relayed data can be encrypted. The reporting MS would forward the information in an encrypted form, and the infrastructure 611 (or the LI entity 612) would then decrypt the data. It will be further appreciated that the designation information 506 can be encrypted as well, to prevent disclosure of the target MSs.

Not every infrastructure 611 may be equipped for lawful intercept and even if equipped may not be entitled to intercept information for all warrants. To avoid unneeded reporting, the infrastructure may, through one of the fixed transceivers 609, 610, inform a communicating MS whether or not it requires reporting of surveillance data and if so which surveillance data and which data from which geographical zone. If an MS is able to determine that intercepted data is beyond the jurisdictional borders for a particular infrastructure entity then it need not intercept or at least not report information for a target to this infrastructure.

In another variation, a first MS will discover that it is under surveillance itself, or that a second MS with which it is conversing is being surveilled. The first MS will then report IRI and/or ACC to the infrastructure 611, as appropriate. One may think that a target user would notice such reporting and would try to stop it. However, in an ad-hoc network, part of the bandwidth of each MS normally is used for the relaying of information for other MSs, beyond the control of the MS's user. Hence, additional traffic through an MS should be familiar to users. In a good implementation, the additional traffic is transparent anyway, and the end-user would not be aware of the surveillance.

In both of the preceding variations, there is a way to forward information to the infrastructure 611. In yet another variation, we describe lawful intercept (LI) of MSs that are isolated from the infrastructure 611. In this variation, again, when an MS discovers that it relays information for an MS that is being surveilled, that it is being surveilled itself, or that it communicates with an MS that is being surveilled, it will try to forward the intercepted information towards the infrastructure 611.

If an MS, e.g., the MS 608 receives LI information that cannot be forwarded to the infrastructure 611, it will store the call information 508 instead. It stores the information in the operator-controlled memory space 504. When insufficient storage space is available, an MS will preferably store IRI and discard ACC, because IRI takes much less space. It may also enlist the help of other MSs to store LI information (For example, the MS 603 and the MS 604 may store different parts of the intercepted information).

The stored LI information is useful only if it reaches the law enforcement agency. Therefore, MSs are programmed to forward stored LI information to the infrastructure 611 when they can contact infrastructure that has the ability to handle surveillance data. For the preceding variations to work without too much redundant LI reporting, the system preferably uses rules that control how MSs will intercept and store information. Rules concerning which MS will intercept can be simple. For example, the relaying MS that appears (through conventional location techniques, or by counting the number of wireless hops) to be closest to the target MS will do the reporting on the target MS. For storage, one can assign the MS with available storage space that appears to be closest to the infrastructure 611. Moreover, unique call identifiers in the reported call information can be used by a lawful intercept entity or by a predetermined billing computer to recognize and filter redundant reports.

An alternative way for a law enforcement agency to obtain LI information is to use a roving LI MS that will contact any nearby other MS in the ad-hoc network. The LI MS is equipped with special software that allows it to collaborate with the other MS and cause the other MS to forward the stored call information to the LI MS, much as the infrastructure 611 can cause a reporting MS to forward call information to the infrastructure.

Preferably, all intercepted information is tagged with a timestamp and a location. An additional aspect in accordance with the present invention is related to how to handle the expiration time of a warrant. There are at least two ways to handle the expiration time:

1. The wired infrastructure can be aware of the expiration time and filter all LI reports that are generated after the expiration time.

2. The designation information 506 in the operator-controlled memory 504 can contain the expiration time. The MS will no longer intercept information on a target after the expiration time.

The laws distinguish LI of signaling information and of call content. By law, all LI must be done in (near) real time when possible. This capability, as well as non-real time capability advantageously is provided in accordance with the present invention.

Lawful intercept of traditional wireless systems involves limitations as to the geographic extent of the wireless service area within which surveillance is required or permitted, and limitations as to the duration of the intercept. Such limitations are normally specified in a warrant. Generally the device which controls and authorized wireless service, e.g., the mobile system controller (MSC) for circuit-switched voice, or the Serving General Packet Radio System Support Node (SGSN) for wireless packet data, will also control which messages are intercepted and reported based on the location of the fixed transceivers or area of coverage of the fixed transceivers.

In the ad-hoc wireless system the actual communications can take place anywhere that the subscriber device travels and can be reported immediately or at a later time to infrastructure, which can be located inside or outside of the lawful surveillance area. To be more specific, communications which take place outside of the surveillance intercept area can be reported to the infrastructure, which exists within the surveillance intercept area, and communications which take place within the surveillance area can be reported to an infrastructure outside of the surveillance area. Depending on the rules that are finally adopted to govern this type of lawful intercept, the reporter MS may need to determine its location and/or the location of the target MS and provide location information along with the call information reported to the FNE and/or billing system. This location information is then reported appropriately to the infrastructure, the LI computer device or to the Law Enforcement Agency, such that the appropriate filtering can take place.

To obtain the location of the target MS, at least one of the MSs preferably comprises a location-determining element for determining a position of the target MS. Several methods can be used to determine the location. For example, the target MS may contain location-determination hardware and software, such as a Global Positioning Satellite (GPS) receiver, and the reporter MS can query the target MS for its location. Alternatively, the reporter MS can contain location-determination hardware and software, measure its own location and assume—given the short range of the wireless link—that the location of the target MS is equal to its own location. In addition, while communicating with a fixed transceiver 609, 610 with a known location, a reporter MS can assume, again given the short range of the wireless link, that the MS's location is equal to the location of the fixed transceiver. The reporter MS may continue to use that location for a limited duration after communication with the transceiver has terminated.

Figure 7:
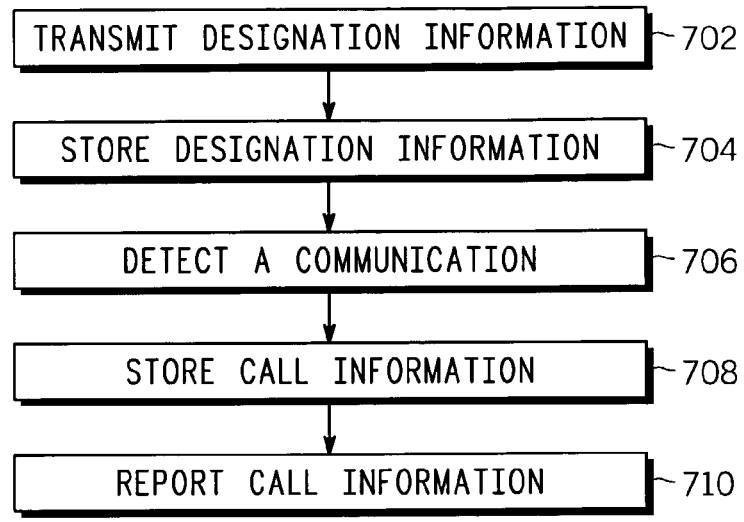
FIG. 7 is a flow chart depicting operation of the second embodiment of a lawful intercept arrangement in the ad-hoc wireless network in accordance with the present invention.

FIG. 7 is a flow chart 700 depicting operation of the wireless network 600 of a lawful intercept arrangement in the ad-hoc wireless network. The flow begins when the infrastructure 611 transmits 702 the designation information 506 to a reporter mobile station (MS 601–608) in the wireless network 600, the designation information identifying a target MS. The designation information is received at a reporter MS either directly or indirectly via another MS. The designation information preferably specifies a surveillance type selected from (a) intercept-related information, (b) actual call content, and (c) both intercept-related information and actual call content. In one embodiment, the designation information also includes location parameters specifying the jurisdiction bounds of the lawful intercept and possibly an expiration time of the warrant. Next, the reporter MS stores 704 the designation information 506 in the operator-controlled memory portion 504, which is preferably accessible to the predetermined LI entity 612 and not modifiable by a user of the reporter MS.

The reporter MS then detects 706 a communication from the target MS. The detected communication can take place directly between the target MS and the reporter MS, or may occur as a result of the reporter MS relaying the communication between the target MS and another entity of the ad-hoc wireless network, e.g., another MS or one of the fixed transceivers 609, 610. In addition, the reporter MS can detect the communication by simply monitoring the communication of a nearby MS, but not actively participating in the communication.

Next the reporter MS stores 708 the call information 508 about the communication in the operator-controlled memory portion 504. The call information preferably includes one of (a) intercept-related information, (b) actual call content, and (c) both intercept-related information and actual call content, as specified by the designation information 506 corresponding to the target MS. In at least one embodiment, the reporter MS includes a location-determining element for determining and reporting a position of the target MS during the communication. In this embodiment, the reporter MS preferably also receives and stores the position of the target MS as part of the call information 508.

Next, the reporter MS reports 710 the call information to a predetermined lawful intercept entity 612. In some cases the reporting MS will have to relay the call information through one or more other MSs operating in the ad-hoc wireless network. In one embodiment, the reporter MS reports the call information as billing information that is maintained by an operator of the ad-hoc wireless network. It will be appreciated that, for the case in which the reporter MS and the target MS are the same MS, the reporter MS will report call information about its own communications in response to the designation information.

In an embodiment in which the reporter MS includes a location-determining element for determining and reporting the position of the target MS during the communication, the reporter MS performs the reporting of the call information in accordance with the position as compared with location parameters provided in the designation information. This latter embodiment advantageously can limit the reporting to a jurisdiction in which the lawful intercept has been authorized. The reporting of the call information in accordance with the position can be implemented in several ways. In one implementation, the MS may store information for all calls, but will report call information only on those calls for which the position is compatible with location parameters provided in the designation information. In a second implementation, the MS stores information for all calls, receives location parameters from the fixed portion of the wireless network at the time of the reporting, and reports call information only on those calls for which the position is compatible with the received location parameters. In a third embodiment, the MS only stores information on those calls for which the position is compatible with location parameters provided in the designation information.

Figure 8:
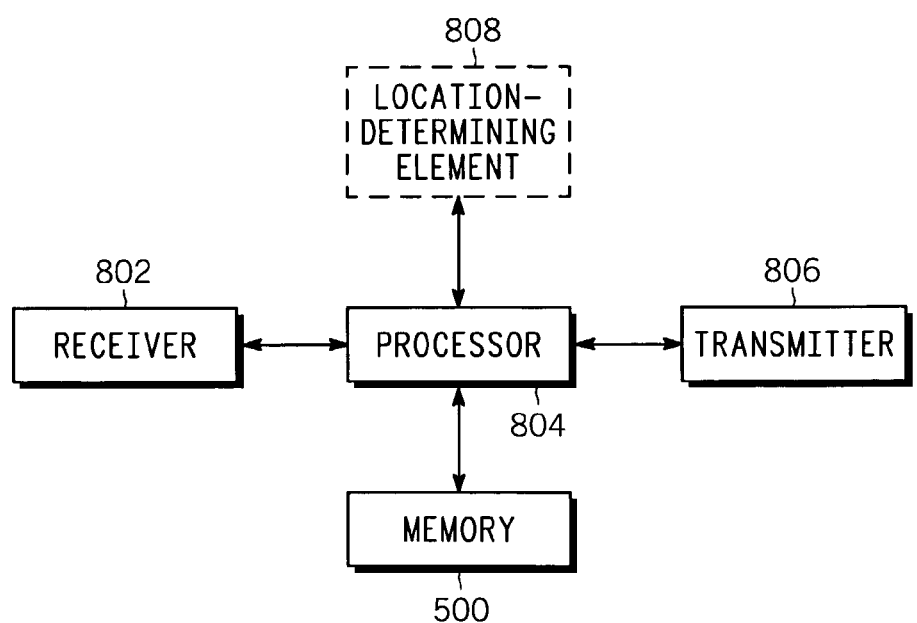
FIG. 8 is an electrical block diagram of a wireless communication device in accordance with the present invention.

FIG. 8 is an electrical block diagram of a wireless communication device 800 performing as a reporter MS. The device 800 comprises a wireless receiver 802 for receiving designation information identifying a target MS. The device 800 further comprises a processor 804 coupled to the receiver 802 for controlling the device 800 and for processing the designation information. The device 800 also includes the memory 500 coupled to the processor 804, which has been disclosed herein above, and which includes:

a first memory location for storing said designation information 506; a detector program 510 for programming the processor 804 to detect a communication from said target MS; a second memory location for storing call information 508 about said communication; and a reporter program 512 for programming the processor 804 to report the call information to a predetermined lawful intercept entity. In addition, the device 800 includes a transmitter 806 coupled to the processor 804 for transmitting, typically upon demand, the call information 508 to the predetermined lawful intercept entity, preferably through the infrastructure 611, or alternatively, directly over the air.

It should be noted that the first and second memory locations 506, 508 are accessible to the predetermined lawful intercept entity and not modifiable by a user of the wireless communication device 800. It should be further noted that the receiver 802 and the processor 804 are arranged and programmed to receive and respond to designation information comprising a surveillance type selected from (a) intercept-related information, (b) actual call content, and (c) both intercept-related information and actual call content.

The reporter program 512 is arranged to program the processor 804 to report the wireless communication device's own communications in response to the designation information when the target MS and the wireless communication device 800 are the same MS. The reporter program 512 is further arranged to program processor 804 to relay the call information through another MS operating in the ad-hoc wireless network if required. In one embodiment, the reporter program 512 is arranged to program the processor 804 to report billing information that is maintained by an operator of the ad-hoc wireless network. In another embodiment, the wireless communication device comprises a location-determining element 808 for determining a position of the target MS (assumed equal to that of the reporter MS) during the communication. In that embodiment, the second memory location 508 and the processor 804 are arranged and programmed to store the position, and the reporter program 512 is arranged to program the processor 804 to report the call information in accordance with the position as compared with location parameters provided in the designation information.

Thus, it should be clear from the preceding disclosure that the present invention advantageously provides a method and apparatus for providing information intercept in an ad-hoc wireless network when authorized, such as by a warrant. One of ordinary skill in the art will recognize the technique disclosed herein is general and can be implemented with many degrees of freedom. This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for providing information intercept in an ad-hoc wireless network, the method comprising:
   receiving designation information at a reporter mobile station (MS) in the wireless network, said designation information identifying a target MS, wherein designation information includes specifying a surveillance type selected from (a) intercept-related information, (b) actual call content, and (c) both intercept-related information and actual call content; storing said designation information in said reporter MS;
   detecting a communication from said target MS by said reporter MS;
   storing call information about said communication in said reporter MS; and
   reporting said call information to a predetermined lawful intercept entity by said reporter MS.

2. A wireless communication device performing as a reporter mobile station (MS) for providing information intercept in an ad-hoc wireless network, the wireless communication device comprising:
   a receiver for receiving designation information identifying a target MS said designation information specifying lawful intercept of signaling related call information for said target MS;
   a processor coupled to said receiver for controlling the wireless communication device;
   a first memory location coupled to said processor for storing said designation information;
   a detector program coupled to said processor for programming said processor to detect a communication with said target MS;
   a second memory location coupled to said processor for storing said signaling related call information about said communication; and
   a reporter program coupled to said processor for programming said processor to report said signaling related call information to a lawful intercept entity.

3. The wireless communication device of claim 2, further comprising
   a transmitter coupled to said processor for transmitting said signaling related call information to said lawful intercept entity.

4. The wireless communication device of claim 2,
   wherein said target MS and the wireless communication device are the same MS, and
   wherein said reporter program is arranged to program said processor to report the wireless communication device's own communications in response to said designation information.

5. The wireless communication device of claim 2, wherein said first and second memory locations are accessible to said lawful intercept entity and not modifiable by a user of the wireless communication device.

6. The wireless communication device of claim 2, wherein said reporter program is arranged to program said processor to relay said signaling related call information through another MS operating in the ad-hoc wireless network.

7. The wireless communication device of claim 2, wherein said receiver and said processor are arranged and programmed to receive and respond to designation information comprising a surveillance type selected from (a) intercept-related information, (b) actual call content, and (c) both intercept-related information and actual call content.

8. The wireless communication device of claim 2, wherein said reporter program is arranged to program said processor to report billing information that is maintained by an operator of the ad-hoc wireless network.

9. The wireless communication device of claim 2,
further comprising a location-determining element for determining a position of said target MS during said communication, and wherein said second memory location and said processor are arranged and programmed to store said position, and wherein said reporter program is arranged to program said processor to report said signaling related call information in accordance with said position as compared with location parameters provided in said designation information.

* * * * *